United States Patent
Imamura (10) Patent No.: US 10,965,122 B2
(45) Date of Patent: Mar. 30, 2021

(54) INFORMATION PROCESSING APPARATUS INCLUDING PLURALITY OF POWER SUPPLY UNITS FOR SUPPLYING POWER TO FAN

(71) Applicant: CANON KABUSHIKI KAISHA, Tokyo (JP)

(72) Inventor: Takeru Imamura, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/709,157

(22) Filed: Dec. 10, 2019

(65) Prior Publication Data

US 2020/0203949 A1 Jun. 25, 2020

(30) Foreign Application Priority Data

Dec. 20, 2018 (JP) .............................. JP2018-237895

(51) Int. Cl.
*H02J 1/10* (2006.01)
*G05F 1/66* (2006.01)
*G05F 1/26* (2006.01)

(52) U.S. Cl.
CPC .................. *H02J 1/10* (2013.01); *G05F 1/26* (2013.01); *G05F 1/66* (2013.01)

(58) Field of Classification Search
CPC .................. H02J 1/10; G05F 1/26; G05F 1/66
See application file for complete search history.

(56) References Cited

FOREIGN PATENT DOCUMENTS

JP 2007-142047 A 6/2007

*Primary Examiner* — Robert L Deberadinis
(74) *Attorney, Agent, or Firm* — Canon U.S.A., Inc. IP Division (57) ABSTRACT

An information processing apparatus includes a fan, a plurality of power supply units, and a reception unit. The plurality of power supply units supplies power to the fan. The reception unit receives, from the fan, a signal indicating a state of the fan. At least one of the plurality of power supply units that supplies power to the fan also supplies power to the reception unit.

21 Claims, 7 Drawing Sheets

INFORMATION PROCESSING APPARATUS INCLUDING PLURALITY OF POWER SUPPLY UNITS FOR SUPPLYING POWER TO FAN

BACKGROUND

Field

The present disclosure relates to an information processing apparatus including a plurality of power supply units that supplies power to a fan.

Description of the Related Art

An information processing apparatus includes a cooling device such as a power supply fan that cools a power supply unit so that the power supply unit can stably operate. Japanese Patent Application Laid-Open No. 2007-142047 discusses a control device that includes a fan whose rotation speed varies based on a voltage to be input, and a plurality of power supply units that outputs different voltages to the fan. In a case where a voltage is input into the fan from a first voltage supply unit, the fan rotates at a low speed. In a case where voltages are input into the fan from both the first and second voltage supply units, the fan rotates at a high speed.

Japanese Patent Application Laid-Open No. 2007-142047 does not discuss a method for detecting a failure of the fan. A mechanism that an abnormality detection unit detects abnormality of the fan has been conventionally known. Conventionally, when the abnormality detection unit receives, from the fan, a fan lock signal to be output when an operation of the fan is stopped, it is determined that the fan is abnormal.

SUMMARY

The fan lock signal is output when an operation of the fan is stopped due to abnormality of the fan itself. Further, also in a case where abnormality occurs in a power supply unit that supplies power to the fan, the operation of the fan is stopped, and the fan lock signal is output. For this reason, in the conventional mechanism, it cannot be definitely specified whether the operation of the fan is stopped due to abnormality of the fan itself or due to abnormality of the power supply unit that supplies power to the fan.

The present disclosure is directed to an information processing apparatus in which it can be specified whether abnormality occurs in a fan or in a power supply unit that supplies power to the fan.

According to an aspect of the present disclosure, an information processing apparatus includes a fan, a plurality of power supply units configured to supply power to the fan, and a reception unit configured to receive, from the fan, a signal indicating a state of the fan, wherein at least one of the plurality of power supply units that supplies power to the fan also supplies power to the reception unit.

Further features of the present disclosure will become apparent from the following description of exemplary embodiments with reference to the attached drawings.

DESCRIPTION OF THE EMBODIMENTS

Exemplary embodiments of the present disclosure will be described with reference to the attached drawings.

Figure 1:
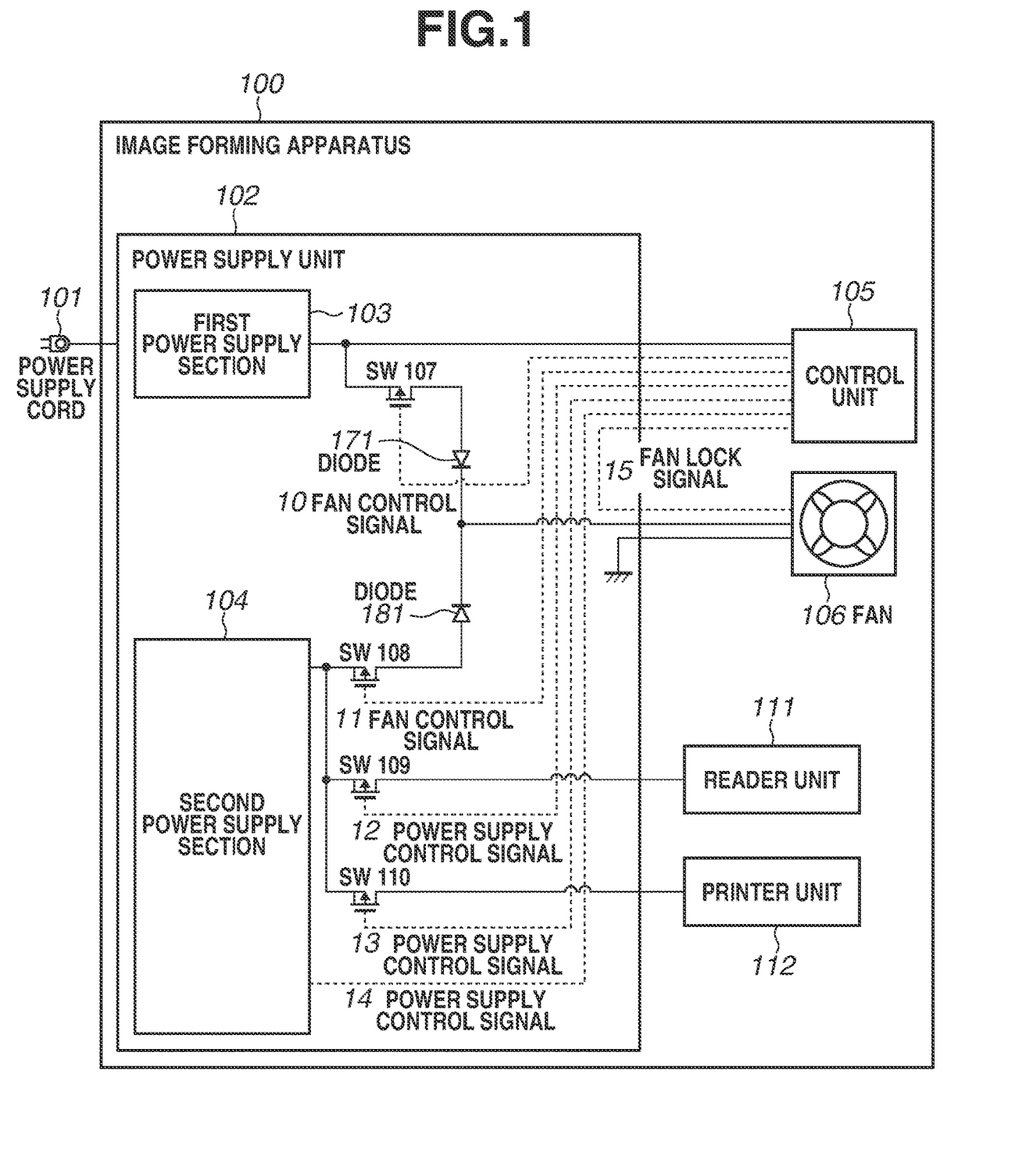
FIG. 1 is a block diagram illustrating a power supply configuration of an image forming apparatus according to a first exemplary embodiment.

FIG. 1 is a block diagram illustrating a power supply configuration of an image forming apparatus according to a first exemplary embodiment. In the first exemplary embodiment, the image forming apparatus that includes a printer unit and a scanner unit will be described as an example of the information processing apparatus of the present disclosure. The present disclosure can be applied to various information processing apparatuses such as a storage server and a personal computer. In FIG. 1, power supply lines for supplying power are indicated by solid lines, and signal lines for controlling signals are indicated by dotted lines.

Alternating power is supplied from a power supply cord 101 to a power supply unit 102. The power supply unit 102 has a first power supply unit 103 and a second power supply unit 104. The first power supply unit 103 and the second power supply unit 104, which are alternating current-direct current (ACDC) converters, convert AC power to DC power and output the DC power. The first power supply unit 103 supplies power to a control unit (abnormality detection unit) 105. The control unit 105 is a unit that mainly controls an entire image forming apparatus 100. Details of the control unit 105 will be described with reference to FIG. 2. The second power supply unit 104 supplies power to a reader unit 111 and a printer unit 112 having many drive parts such as a motor. An output voltage from the second power supply unit 104 is higher than an output voltage from the first power supply unit 103.

The image forming apparatus 100 includes a fan 106 that cools the power supply unit 102. A rotation speed of the fan 106 varies based on a voltage to be supplied. A voltage to be input into the fan 106 is switched to adjust an air volume of the fan 106, so that the power supply unit 102 is suitably cooled. A voltage to be output from the first power supply unit 103 and a voltage to be output from the second power supply unit 104 are input into the fan 106. A fan control switch 107 and a diode 171 are disposed between the first power supply unit 103 and the fan 106. A fan control switch 108 and a diode 181 are disposed between the second power supply unit 104 and the fan 106. The fan control switches 107 and 108 are field effect transistors (FETs). The diode 171 prevents an electric current from flowing from the second power supply unit 104 to the first power supply unit 103. The diode 181 prevents an electric current from flowing from the first power supply unit 103 to the second power supply unit 104. The fan control switches 107 and 108 are turned on or off by the control unit 105. A fan control signal 10 to be output from the control unit 105 turns on or off the fan control switch 107. The fan control switch 108 is turned on or off based on a fan control signal 11 to be output from the control unit 105.

A voltage to be input into the fan 106 is switched based on a power state of the image forming apparatus 100. For example, in an operation state where print and copying are performed, a voltage output from the second power supply unit 104 is input into the fan 106. If the print and copying are completed and the image forming apparatus 100 is in a standby state, a voltage output from the first power supply unit 103 is input into the fan 106. If a predetermined time elapses without an operation from a user in the standby state, the image forming apparatus 100 is shifted into a power saving state. In the power saving state, the fan 106 is stopped.

The control unit 105 detects abnormality of the fan 106 based on a fan lock signal 15 to be output from the fan 106. The fan lock signal 15 indicates a state of the fan 106. The fan 106 is rotated by a drive force (magnetic force) of a DC motor including a brush. The fan 106 has a Hall element that detects a magnetic field using a Hall effect, and outputs the fan lock signal 15 corresponding to a detection result of the Hall element. Specifically, if the detection result of the Hall element is not changed, the fan 106 outputs the fan lock signal 15. If the detection result of the Hall element is changed, the fan 106 does not output the fan lock signal 15. In a case where the fan lock signal 15 is input into the control unit 105, the control unit 105 detects abnormality in the fan 106 or in the power supply units 103 and 104.

The second power supply unit 104 is turned on or off based on a power supply control signal 14 to be output from the control unit 105. The second power supply unit 104 is turned off in a case where the image forming apparatus 100 is in the power saving state, and is turned on in a case where the image forming apparatus 100 is in the standby state or the operation state. In a case where the second power supply unit 104 is off, the second power supply unit 104 does not output a voltage to the fan 106 even if the control unit 105 outputs the fan control signal 11. In the first exemplary embodiment, in a case where the reader unit 111 or the printer unit 112 is being operated and, thus, the image forming apparatus 100 consumes a comparatively large amount of power, the fan 106 is driven by a voltage to be output from the second power supply unit 104. In a case where the image forming apparatus 100 is in the standby state where the reader unit 111 or the printer unit 112 is not being operated, the power supply control signal 14 may be synchronized with the fan control signal 11 so that the fan 106 is driven using a voltage to be output from the second power supply unit 104.

The second power supply unit 104 supplies power to the reader unit 111. A reader switch 109 is disposed between the second power supply unit 104 and the reader unit 111. The reader switch 109 is turned on or off based on a power supply control signal 12 to be output from the control unit 105. A reader power supply 22 to be output from the second power supply unit 104 is input into the reader unit 111 via the reader switch 109. The second power supply unit 104 supplies power to the printer unit 112. A printer switch 110 is disposed between the second power supply unit 104 and the printer unit 112. The printer switch 110 is turned on or off based on a power supply control signal 13 to be output from the control unit 105. A printer power supply 23 to be output from the second power supply unit 104 is input into the printer unit 112 via the printer switch 110. The reader switch 109 for the reader unit 111 and the printer switch 110 for the printer unit 112 are separately disposed, so that power consumption during only a scanning operation or a printing operation can be reduced.

In the image forming apparatus 100 according to the first exemplary embodiment, control over the fan 106 for cooling the power supply unit 102 is switched based on the power state of the image forming apparatus 100. In this way, quietness, a reduction in power consumption, and stable power supply can be achieved.

Figure 2:
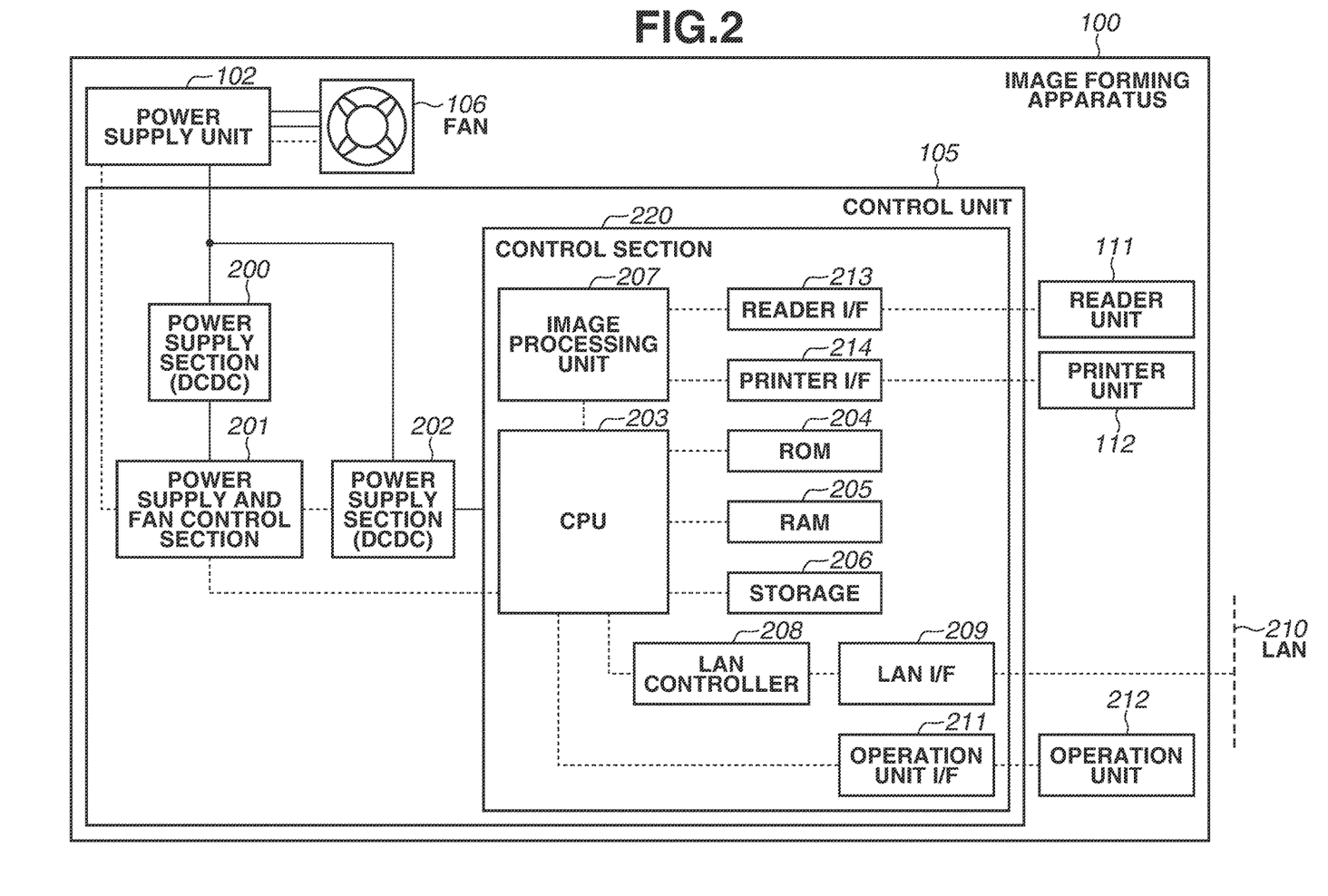
FIG. 2 is a block diagram illustrating details of a control unit.

FIG. 2 is a block diagram illustrating details of the control unit 105. Also in FIG. 2, power supply lines for supplying power are indicated by solid lines, and signal lines for controlling signals are indicated by dotted lines. Power is supplied to the control unit 105 from the power supply unit 102. A voltage input into the control unit 105 is stepped down by a power supply unit 200 which is a DC-DC converter, and is supplied to a power supply and fan control unit 201. The power supply and fan control unit 201 supplies or stops power to the fan 106 based on outputs of the fan control signal 10 and the fan control signal 11. The power supply and fan control unit 201 receives a signal (fan lock signal 15) indicating a state of the fan 106 via the power supply unit 102. The power supply and fan control unit 201 supplies or stops a plurality of power outputs from a power supply unit 202 including a plurality of DC-DC converters in a control unit 220. The power supply and fan control unit 201 is communicably connected to a central processing unit (CPU) 203 of the control unit 220. The power supply and fan control unit 201 controls power for the fan 106 based on an instruction from the CPU 203. The power supply and fan control unit 201 outputs a signal indicating a power state of the image forming apparatus 100 and a signal indicating a state of the fan 106 including abnormality, as interrupt signals to be sent to the CPU 203.

The CPU 203 executes a software program. A random access memory (RAM) 205 is used for temporary storage of data to be used by the CPU 203. A read only memory (ROM) 204 stores a start-up program and various setting values of the image forming apparatus 100. The CPU 203 is communicably connected to a storage 206. The storage 206 is a hard disk drive (HDD) or a solid state drive (SSD). The CPU 203 is communicably connected to the storage 206 by Serial Advance Technology Attachment (hereinafter, SATA). Parallel ATA (hereinafter, PATA) may be used instead of SATA. The CPU 203 writes data into the storage 206 or reads data from the storage 206. The CPU 203 is communicably connected to a local area network (LAN) controller 208, and is connected to a LAN 210 via a LAN interface (I/F) 209.

An operation unit 212, which has a touch panel and hard keys for operations, accepts an instruction to be input by a user. An operation unit interface (hereinafter, I/F) 211, which is an interface that connects the CPU 203 and the operation unit 212, transmits the instruction accepted from the user by the operation unit 212 to the CPU 203. The CPU 203 executes various processing based on input instructions. The CPU 203 is communicably connected to the reader unit 111 having an auto document feeder (ADF) and an image reading sensor via a reader I/F 213. The reader unit 111 reads an image of a document placed on a platen glass or the ADF and generates image data. The printer unit 112 prints an image based on the generated image data or the read image data onto a sheet. The CPU 203 is communicably connected to the printer unit 112 via a printer I/F 214. An image processing unit 207 executes image processing on the image data generated by the reader unit 111. The image processing unit 207 executes image processing on the image data output from the CPU 203 and outputs the processed image data to the printer unit 112.

Figure 3:
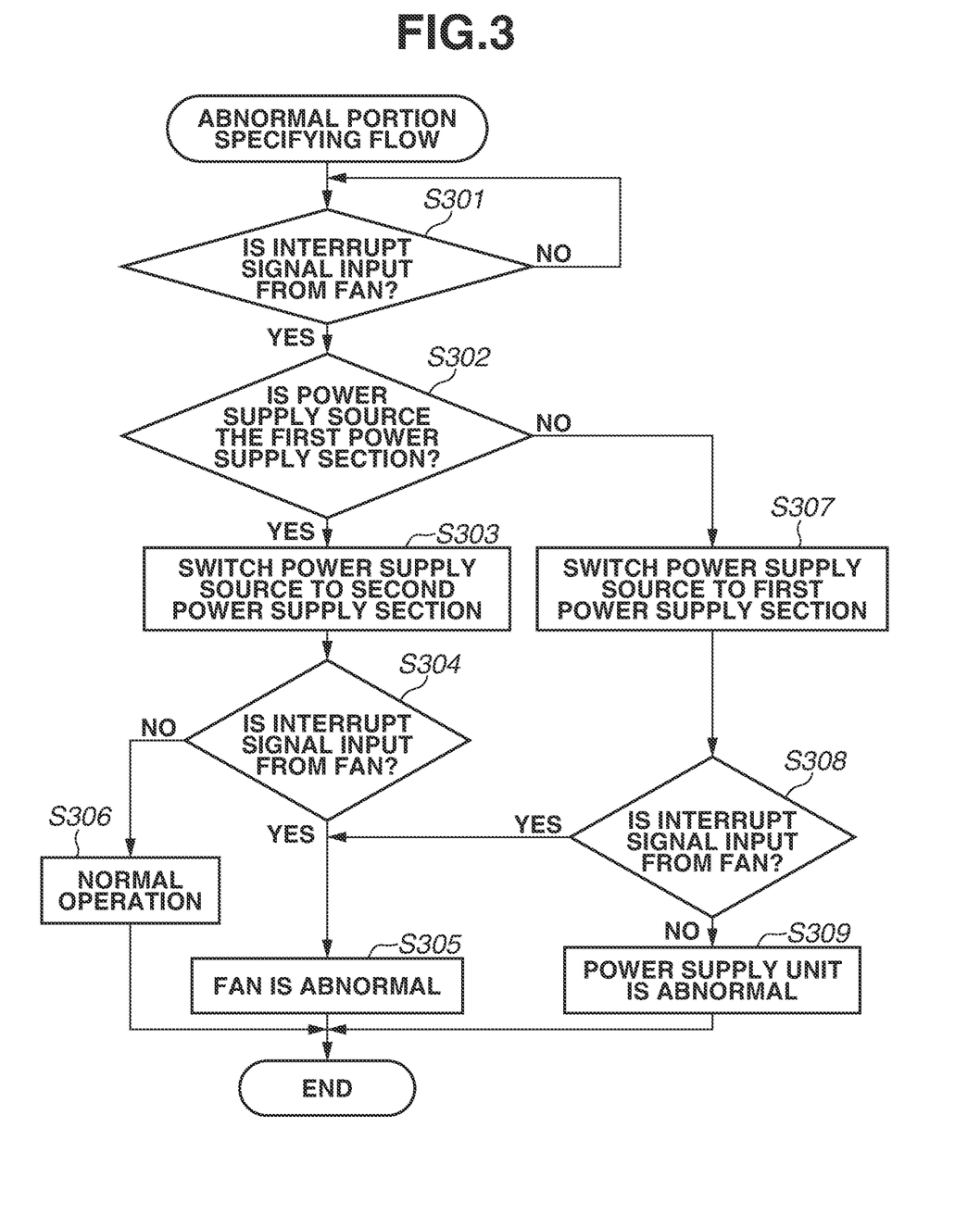
FIG. 3 is a flowchart of specifying an abnormal portion.

FIG. 3 is a flowchart of determining an abnormal portion. A method for specifying an abnormal unit including the fan 106 will be described in detail with reference to FIG. 3. Respective steps in FIG. 3 are executed by the CPU 203.

The power supply and fan control unit 201 receives the fan lock signal 15 output from the fan 106. Upon receiving the fan lock signal 15, the power supply and fan control unit 201 outputs an interrupt signal 19 to the CPU 203. In a case where the interrupt signal 19 is input (Yes in step S301), the CPU 203 determines whether a power supply source that supplies power to the fan 106 is the first power supply unit 103 (step S302). The CPU 203 can make the determination in step S302 because the CPU 203 knows whether the power supply source that supplies power to the fan 106 is the first power supply unit 103 or the second power supply unit 104.

If the CPU 203 determines that the power supply source that supplies power to the fan 106 is the first power supply unit 103 (Yes in step S302), the CPU 203 switches the power supply source that supplies power to the fan 106 from the first power supply unit 103 to the second power supply unit 104 (step S303). In a case where the interrupt signal 19 is input from the power supply and fan control unit 201 again after the CPU 203 switches the power supply source to the second power supply unit 104 (Yes in step S304), the CPU 203 determines that the fan 106 is abnormal and notifies a user of the abnormal state (step S305). On the other hand, in a case where the interrupt signal 19 is not input from the power supply and fan control unit 201 after the CPU 203 switches the power supply source to the second power supply unit 104 (No in step S304), the CPU 203 continues the operation of the fan 106 with the output from the second power supply unit 104 (step S306).

If the CPU 203 determines that the power supply source that supplies power to the fan 106 is the second power supply unit 104 (No in step S302), the CPU 203 switches the power supply source from the second power supply unit 104 to the first power supply unit 103 (step S307). In a case where the interrupt signal 19 is input from the power supply and fan control unit 201 again after the CPU 203 switches the power supply source to the first power supply unit 103 (Yes in step S308), the CPU 203 determines that the fan 106 is abnormal and notifies the user that the fan 106 is abnormal (step S305). On the other hand, in a case where the interrupt signal 19 is not input from the power supply and fan control unit 201 after the CPU 203 switches the power supply source to the first power supply unit 103 (No in step S308), the CPU 203 notifies the user that the second power supply unit 104 is abnormal (step S309).

In the first exemplary embodiment, the user is notified of an abnormal state displayed on a display unit of the operation unit 212. Alternatively, a system administrator or a service engineer can be notified of the abnormal state via the LAN 210.

Figure 4A:
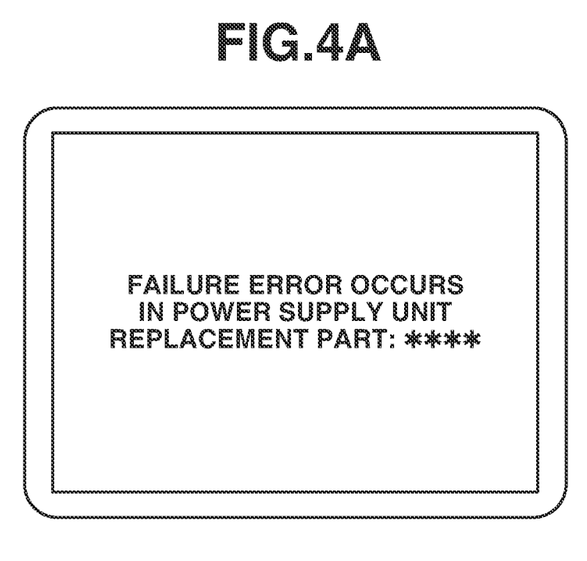
FIGS. 4A and 4B are diagrams illustrating screens to be displayed on a display unit of an operation unit.
Figure 4B:
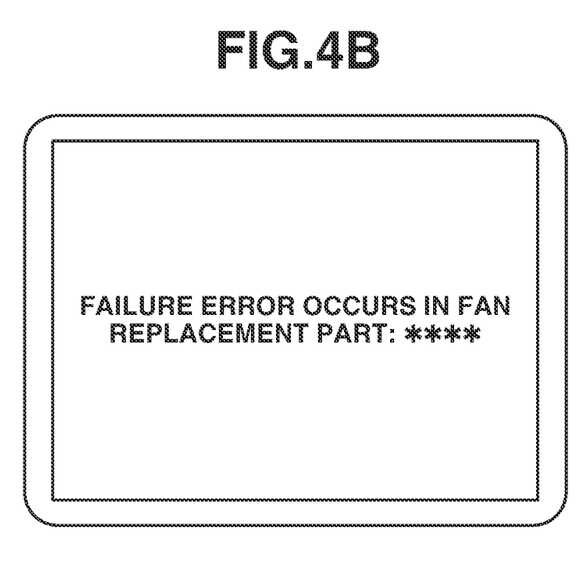

FIGS. 4A and 4B are diagrams illustrating screens to be displayed on the display unit of the operation unit 212. In step S305 of FIG. 3, the CPU 203 displays information indicating a failure of the fan 106 as illustrated in FIG. 4B. On the screen in FIG. 4B, a number for specifying a replacement part as well as the information indicating the failure of the fan 106 is displayed. In step S309 of FIG. 3, the CPU 203 displays information indicating a failure of the power supply unit 102 as illustrated in FIG. 4A. On the screen in FIG. 4A, a number for specifying a replacement part as well as the information indicating the failure of the power supply unit 102 is displayed. This screen can show the failure of the second power supply unit 104 as distinguished from the first power supply unit 103.

In the first exemplary embodiment, the CPU 203 switches the power supply source that supplies power to the fan 106 when the fan lock signal 15 is output, and thereby determines whether abnormality occurs in the fan 106 or in the power supply unit 102. As a result, the service engineer can determine whether the power supply unit 102 should be replaced or the fan 106 should be replaced. An output from one of the two power supply units is switched to an output from the other, and the output from the other power supply unit is input into the power supply unit 102. In this way, a step-down circuit needs not to be added, unlike a case where an output from one power supply unit and an output obtained by stepping down the output are supplied to the power supply unit 102. Quietness and a reduction in power consumption can be achieved by reducing the voltage to be input into the power supply unit 102. In a configuration where a plurality of voltages can be supplied to the power supply unit 102, a defective unit can be specified. A voltage, which is higher than the voltages to be supplied to the power supply and fan control unit 201 and the control unit 220, is supplied to the fan 106. As a result, also in a case where the fan 106 is deteriorated to be hardly driven, the power supply unit 102 can be driven. In this way, the apparatus can be continuously used.

Figure 5:
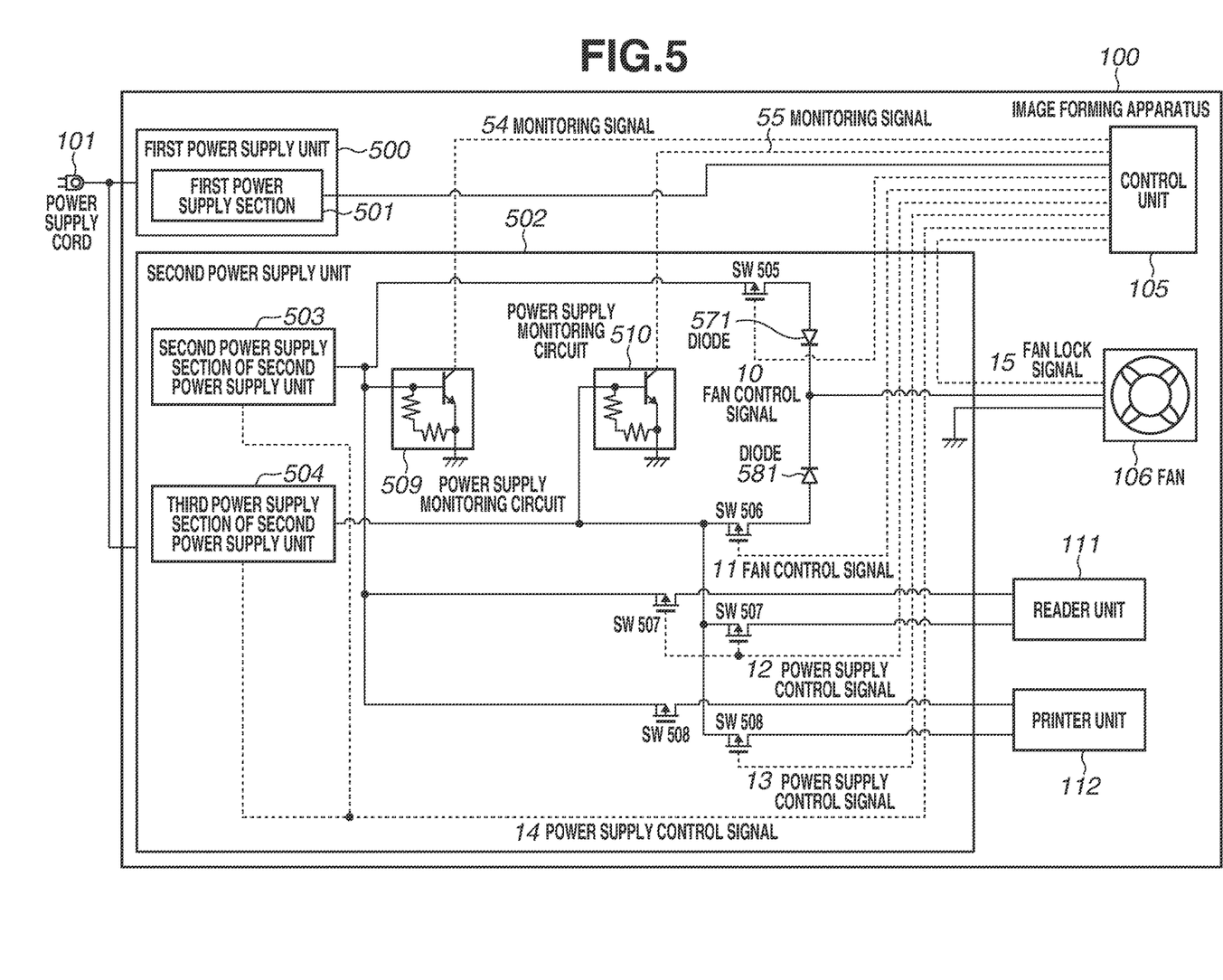
FIG. 5 is a block diagram illustrating a power supply configuration of an image forming apparatus according to a second exemplary embodiment.

In a second exemplary embodiment, in a configuration where a plurality of power supply units 503 and 504, which is different from a power supply unit 501 that supplies power to the control unit 105, supplies power to the fan 106, a defective unit is specified. In the second exemplary embodiment, a plurality of voltages, which is higher than the voltage to be supplied to the control unit 105, is desired to be output to the fan 106. For this reason, the plurality of power supply units 503 and 504, which is different from the power supply unit 501 that supplies power to the control unit 105, supplies power to the fan 106.

FIG. 5 is a block diagram illustrating a power supply configuration of an image forming apparatus according to the second exemplary embodiment. In the second exemplary embodiment, portions different from the first exemplary embodiment will be mainly described.

Alternating power supplied from the power supply cord 101 is supplied to a first power supply unit 500 and a second power supply unit 502. A first power supply unit 501 of the first power supply unit 500 supplies power to the control unit 105. The second power supply unit 502 has a second power supply unit 503 and a third power supply unit 504. The first power supply unit 501, the second power supply unit 503, and the third power supply unit 504, which are AC-DC converters, convert alternating power to direct power to output the direct power. The second power supply unit 503 supplies power to a device (integrated circuit (IC), etc.) of a control system in the reader unit 111 and a device (IC, etc.) of a control system in the printer unit 112. The third power supply unit 504 supplies power to a device (motor, etc.) of a drive system in the reader unit 111 and a device (motor, etc.) of a drive system in the printer unit 112. The third power supply unit 504 is a power supply that supplies power to the devices of the drive systems. An output voltage from the third power supply unit 504 is higher than an output voltage from the second power supply unit 503 in order to reduce electric currents flowing in the power supply lines.

In the second exemplary embodiment, power supply sources of the power to be supplied to the fan 106 are the second power supply unit 503 and the third power supply unit 504. A voltage to be input into the fan 106 is switched, and consequently, the rotation speed of the fan 106 is changed. A fan control switch 505 and a diode 571 are disposed between the second power supply unit 503 and the fan 106. A fan control switch 506 and a diode 581 are disposed between the third power supply unit 504 and the fan 106. The fan control switches 505 and 506 are FETs. The diode 571 prevents an electric current from flowing from the third power supply unit 504 to the second power supply unit 503. The diode 581 prevents an electric current from flowing from the second power supply unit 503 to the third power supply unit 504. The fan control switches 505 and 506 are turned on or off by the control unit 105. The fan control switch 505 is turned on or off based on the fan control signal 10 to be output from the control unit 105. The fan control switch 506 is turned on or off based on the fan control signal 11 to be output from the control unit 105.

In the second exemplary embodiment, the second power supply unit 502 includes a monitoring circuit (monitoring unit) 509 that monitors an output from the second power supply unit 503, and a monitoring circuit (monitoring unit) 510 that monitors an output from the third power supply unit 504. In a case where the fan lock signal 15 is input from the fan 106, the control unit 105 checks levels of a monitoring signal 54 to be output from the monitoring circuit 509 and a monitoring signal 55 to be output from the monitoring circuit 510. The control unit 105 determines whether the power to be supplied to the fan 106 is normally output.

The control unit 105 turns on or off switches 507 to supply or stop the power to be supplied from the second power supply unit 503 to the device of the control system in the reader unit 111 and the power to be supplied from the third power supply unit 504 to the device of the drive system in the reader unit 111. The control unit 105 turns on or off the switches 507 based on the power supply control signal 12. Herein, the switches 507 are turned on or off based on one power supply control signal 12, but the switches 507 may be turned on and off based on separate signals. The control unit 105 turns on or off switches 508 to supply or stop the power to be supplied from the second power supply unit 503 to the device of the control system in the printer unit 112. The control unit 105 turns on or off the switches 508 to supply or stop the power to be supplied from the third power supply unit 504 to the device of the drive system in the printer unit 112. The control unit 105 turns on or off the switches 508 based on a power supply control signal 13. Herein, the two switches 508 are turned on or off based on the one power supply control signal 13, but may be turned on or off based on separate signals.

Figure 6:
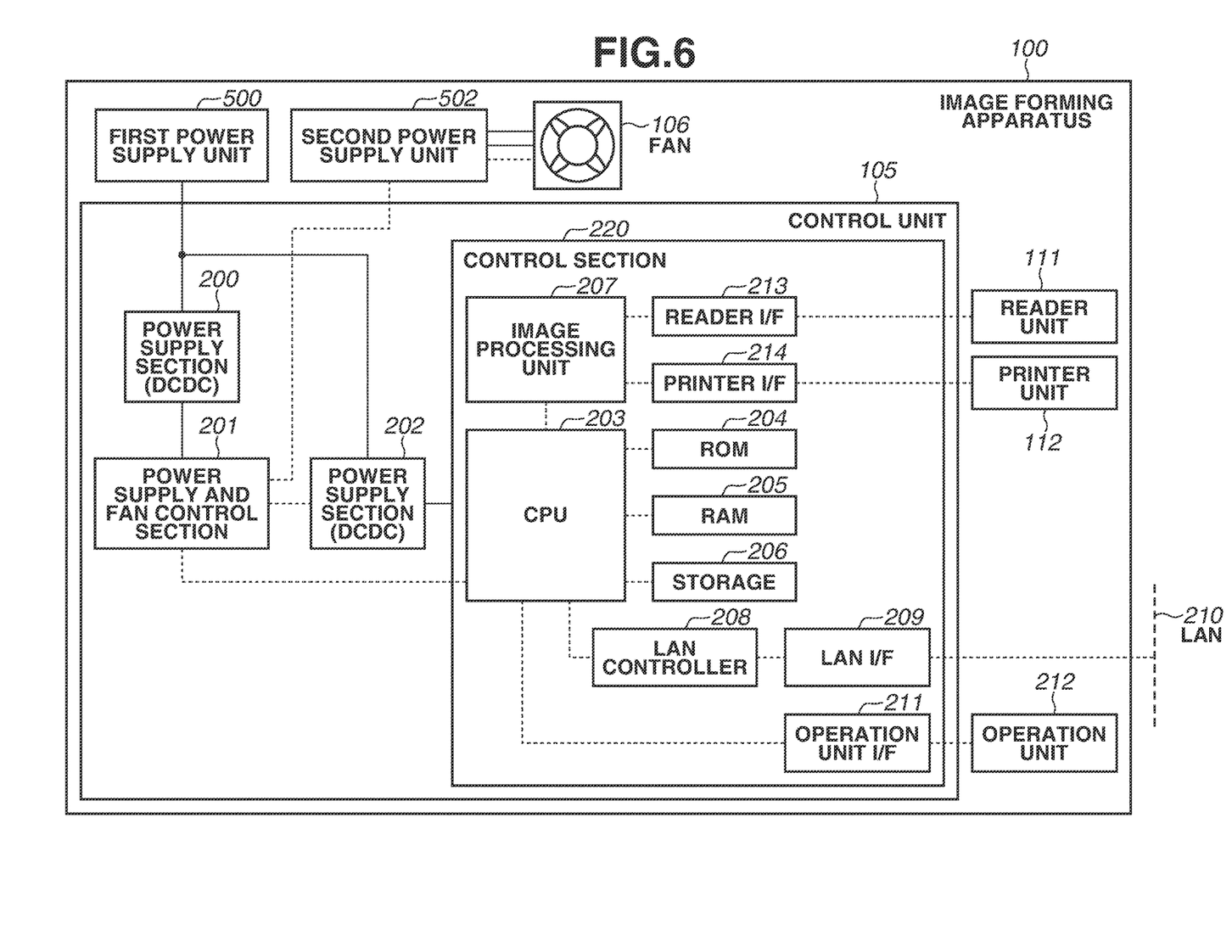
FIG. 6 is a block diagram illustrating details of the control unit.

FIG. 6 is a block diagram illustrating details of the control unit according to the second exemplary embodiment. In the second exemplary embodiment, parts different from the first exemplary embodiment will be mainly described. Also in FIG. 6, power supply lines for supplying power are indicated by solid lines, and signal lines for controlling signals are indicated by dotted lines. A voltage input into the control unit 105 is stepped down by the power supply unit 200 which is a DC-DC converter, and is supplied to the power supply and fan control unit 201. The power supply and fan control unit 201 supplies or stops power to the fan 106 based on outputs of the fan control signal 10 and the fan control signal 11. The power supply and fan control unit 201 receives a signal (fan lock signal 15) indicating a state of the fan 106 via the second power supply unit 502.

Figure 7:
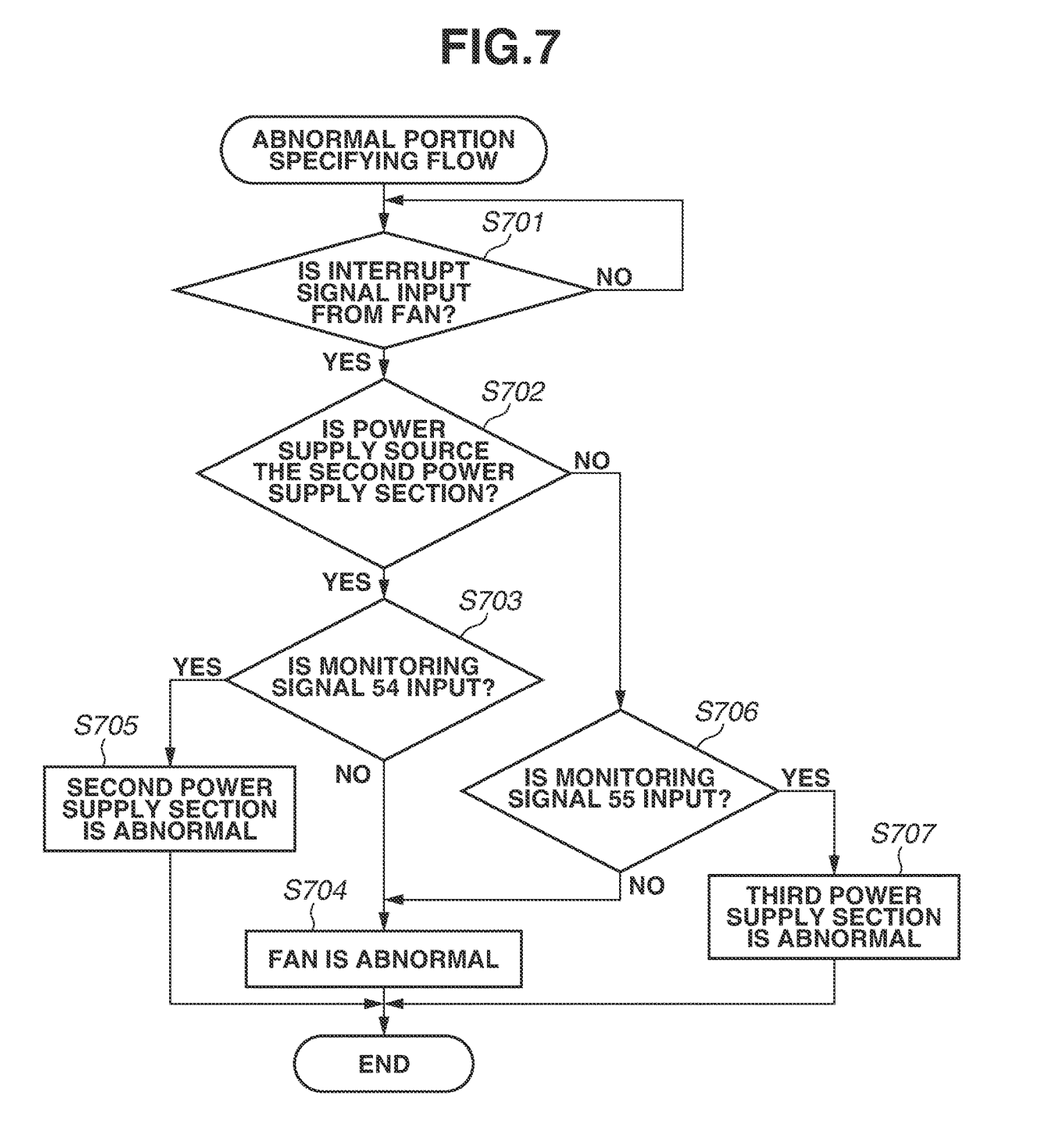
FIG. 7 is a flowchart of specifying an abnormal portion.

FIG. 7 is a flowchart of determining an abnormal portion. A method for specifying an abnormal unit including the fan 106 will be described in detail with reference to FIG. 7. Respective steps in FIG. 7 are executed by the CPU 203.

The power supply and fan control unit 201 receives the fan lock signal 15 output from the fan 106. Upon receiving the fan lock signal 15, the power supply and fan control unit 201 outputs the interrupt signal 19 to the CPU 203. In a case where the interrupt signal 19 is input (Yes in step S701), the CPU 203 determines whether the power supply source that supplies power to the fan 106 is the second power supply unit 503 (step S702). The CPU 203 knows whether the power supply source that supplies power to the fan 106 is the second power supply unit 503 or the third power supply unit 504 and, for this reason, the CPU can make the determination in step S702.

In a case where the CPU 203 determines that the power supply source that supplies power to the fan 106 is the second power supply unit 503 (Yes in step S702), the CPU 203 checks a state of the monitoring signal 54 (step S703). In a case where the monitoring signal 54 is not input (No in step S703), the CPU 203 determines that the fan 106 is abnormal, and notifies a user that the fan 106 is abnormal (step S704). On the other hand, in a case where the monitoring signal 54 is input (Yes in step S703), the CPU 203 determines that the second power supply unit 503 is abnormal, and notifies the user that the second power supply unit 503 is abnormal (step S705). Also in the second exemplary embodiment, the user is notified of the abnormal state displayed on the display unit of the operation unit 212. Alternatively, a system administrator or a service engineer can be notified of the abnormal state via the LAN 210.

In a case where the CPU 203 determines that the power supply source that supplies power to the fan 106 is the third power supply unit 504 (No in step S702), the CPU 203 checks a state of the monitoring signal 55 (step S706). In a case where the monitoring signal 55 is not input (No in step 706), the CPU 203 determines that the fan 106 is abnormal, and notifies the user that the fan 106 is abnormal (step S704). On the other hand, in a case where the monitoring signal 55 is input (Yes in step S706), the CPU 203 determines that the third power supply unit 504 is abnormal, and notifies the user that the third power supply unit 504 is abnormal (step S707).

In the first exemplary embodiment, in a case where the source that supplies power to the fan 106 is the first power supply unit 103 (Yes in step S302), the CPU 203 switches the power source, which supplies power to the fan 106, to the second power supply unit 104 in step S303. However, the CPU 203 can determine that the fan 106 is abnormal at this time without switching the power supply source to the second power supply unit 104. This is because when the control unit 105 that is operated by power supplied from the first power supply unit 103 can recognize a fan lock signal, the CPU 203 can determine that the first power supply unit 103 is not abnormal. Therefore, the CPU 203 can determine that the fan 106 is abnormal at this time.

Aspects of the disclosed information can be achieved also by a configuration where a recording medium, which stores program codes of software achieving the functions in the exemplary embodiments, is supplied to the system or the apparatus. In this case, the above-described functions are achieved by a computer (or CPU or micro processing unit (MPU)) of the system or the apparatus to read the program codes stored in the recording medium and execute the program codes. In this case, the recording medium which stores the program codes configures the present disclosure.

Examples of the recording medium for supplying the program codes include a flexible disk, a hard disk, an optical disk, a magneto-optical disk, a compact disk read only memory (CD-ROM), a compact disk recordable (CD-R), a magnetic tape, a nonvolatile memory card, and a ROM.

The above-described functions in the exemplary embodiments are achieved not only by the computer to execute the read program codes. For example, the above-described functions in the exemplary embodiments are achieved by an operating system (OS), which operates on the computer, to execute a part or whole of actual processing based on instructions of the program codes.

Further, the above-described functions in the exemplary embodiments are achieved by writing the program codes read from the recording medium into a memory provided to a function extension board inserted into the computer or to a function extension unit connected to the computer. In other words, after the program codes are written into the memory, the functions are achieved by a CPU or the like provided to the function extension board or the function extension unit to execute a part or whole of the actual processing based on the instructions of the program codes.

According to the present disclosure, it can be specified whether the fan is abnormal or the power supply unit that supplies power to the fan is abnormal.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-237895, filed Dec. 20, 2018, which is hereby incorporated by reference herein in its entirety.

What is claimed is:
1. An information processing apparatus comprising:
a fan;
a plurality of power supply units configured to supply power to the fan; and
a reception unit configured to receive, from the fan, a signal indicating a state of the fan,
wherein at least one of the plurality of power supply units that supplies power to the fan also supplies power to the reception unit.

2. The information processing apparatus according to claim 1, wherein the fan is a power supply fan configured to cool at least one of the plurality of power supply units.

3. The information processing apparatus according to claim 1,
wherein the plurality of power supply units includes a first power supply unit and a second power supply unit,
wherein an output voltage of the second power supply unit is higher than an output voltage of the first power supply unit, and
wherein the first power supply unit is configured to supply power to the reception unit.

4. The information processing apparatus according to claim 3, wherein, in a case where the reception unit receives a signal indicating abnormality of the fan while the first power supply unit is supplying power to the fan, the reception unit determines that the fan is abnormal.

5. The information processing apparatus according to claim 4, wherein, in a case where the reception unit determines that the fan is abnormal, the reception unit notifies a user of information indicating that the fan is abnormal.

6. The information processing apparatus according to claim 5, further comprising a display unit,
wherein, in a case where the reception unit determines that the fan is abnormal, the reception unit causes the display unit to display the information indicating that the fan is abnormal.

7. The information processing apparatus according to claim 6, wherein, in a case where the reception unit determines that the fan is abnormal, the reception unit causes the display unit to display information for specifying a replacement part of the fan.

8. The information processing apparatus according to claim 1,
wherein the fan includes a Hall element and is configured to be rotated by a magnetic force, and
wherein a detection result of the Hall element is input into the reception unit.

9. The information processing apparatus according to claim 8, wherein the reception unit switches a power supply unit to supply power to the fan based on the detection result.

10. The information processing apparatus according to claim 9, wherein, in a case where the reception unit receives a signal indicating abnormality of the fan after the power supply unit to supply power to the fan is switched, the reception unit determines that the fan is abnormal.

11. The information processing apparatus according to claim 1, further comprising a printer unit.

12. The information processing apparatus according to claim 1, further comprising a reader unit.

13. An information processing apparatus comprising:
a fan;
a first power supply unit configured to supply power to the fan;
a first monitoring unit configured to monitor an output from the first power supply unit;
a second power supply unit configured to supply power to the fan;
a second monitoring unit configured to monitor an output from the second power supply unit; and
a reception unit into which a signal indicating a state of the fan, a signal from the first monitoring unit, and a signal from the second monitoring unit are to be input.

14. The information processing apparatus according to claim 13, wherein the fan is a power supply fan configured to cool at least one of the first power supply unit and the second power supply unit.

15. The information processing apparatus according to claim 13, wherein an output voltage from the first power supply unit is higher than an output voltage from the second power supply unit.

16. The information processing apparatus according to claim 13,
wherein the fan includes a Hall element and is configured to be rotated by a magnetic force, and
wherein the signal indicating the state of the fan corresponds to a detection result of the Hall element.

17. The information processing apparatus according to claim 13, wherein the reception unit specifies an abnormal portion based on the signal indicating the state of the fan, the signal from the first monitoring unit, and the signal from the second monitoring unit.

18. The information processing apparatus according to claim 13, further comprising a printer unit.

19. The information processing apparatus according to claim 13, further comprising a reader unit.

20. A method for an information processing apparatus having a fan, a reception unit, and a plurality of power supply units, the method comprising:
supplying power to the fan via the plurality of power supply units; and
receiving, from the fan, a signal indicating a state of the fan by the reception unit;
wherein at least one of the plurality of power supply units that supplies power to the fan also supplies power to the reception unit.

21. A non-transitory computer-readable storage medium storing a program to cause a computer to perform a method for an information processing apparatus having a fan, a reception unit, and a plurality of power supply units, the method comprising:
supplying power to the fan via the plurality of power supply units; and
receiving, from the fan, a signal indicating a state of the fan by the reception unit;
wherein at least one of the plurality of power supply units that supplies power to the fan also supplies power to the reception unit.

* * * * *